United States Patent [19]
Katz et al.

[11] 3,769,090
[45] Oct. 30, 1973

[54] ELECTROCHEMICAL CELL

[75] Inventors: Murray Katz, Newington; James K. Stedman, Glastonbury, both of Conn.

[73] Assignee: United Aircraft Corporation, Hartford, Conn.

[22] Filed: Aug. 18, 1971

[21] Appl. No.: 172,654

[52] U.S. Cl. ............................................. 136/86 R
[51] Int. Cl. ......................................... H01m 27/00
[58] Field of Search .............. 136/86 B, 86 C, 86 R

[56] References Cited
UNITED STATES PATENTS
| | | | |
|---|---|---|---|
| 3,338,746 | 8/1967 | Plust et al. ........................ | 136/86 C |
| 3,425,873 | 2/1969 | Worsham et al. ................. | 136/86 B |
| 3,227,585 | 1/1966 | Langford et al. .................. | 136/86 E |

Primary Examiner—A. B. Curtis
Assistant Examiner—H. A. Feeley
Attorney—Alfred W. Breiner

[57] ABSTRACT

A compact electrochemical cell utilizing a circulating electrolyte in which the anode and cathode are very closely spaced, decreasing the internal resistance of the cell, is described. The cell comprises in spaced relation a reactant chamber, a gas (bubble) distributor, an electrolyte chamber, a first electrode which is flooded with electrolyte, an electrolyte chamber, a second electrode, and a second reactant chamber. The advantages of a circulating electrolyte are achieved while permitting the use of electrodes and electrode separators having low or zero bubble pressures and while maintaining the internal resistance of the cell low.

16 Claims, 3 Drawing Figures

PATENTED OCT 30 1973　3,769,090
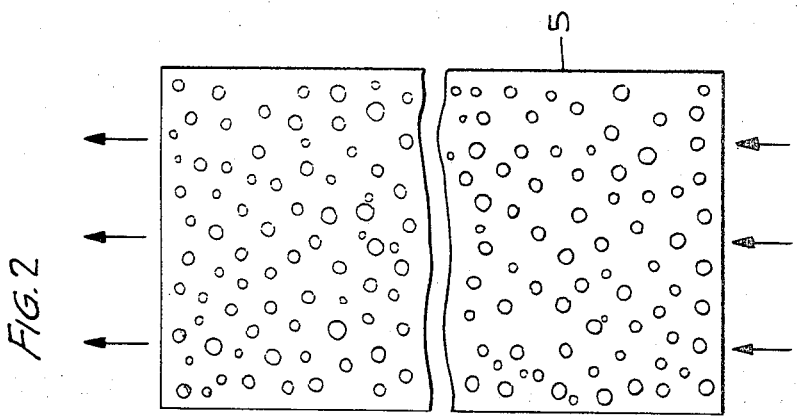
FIG. 2
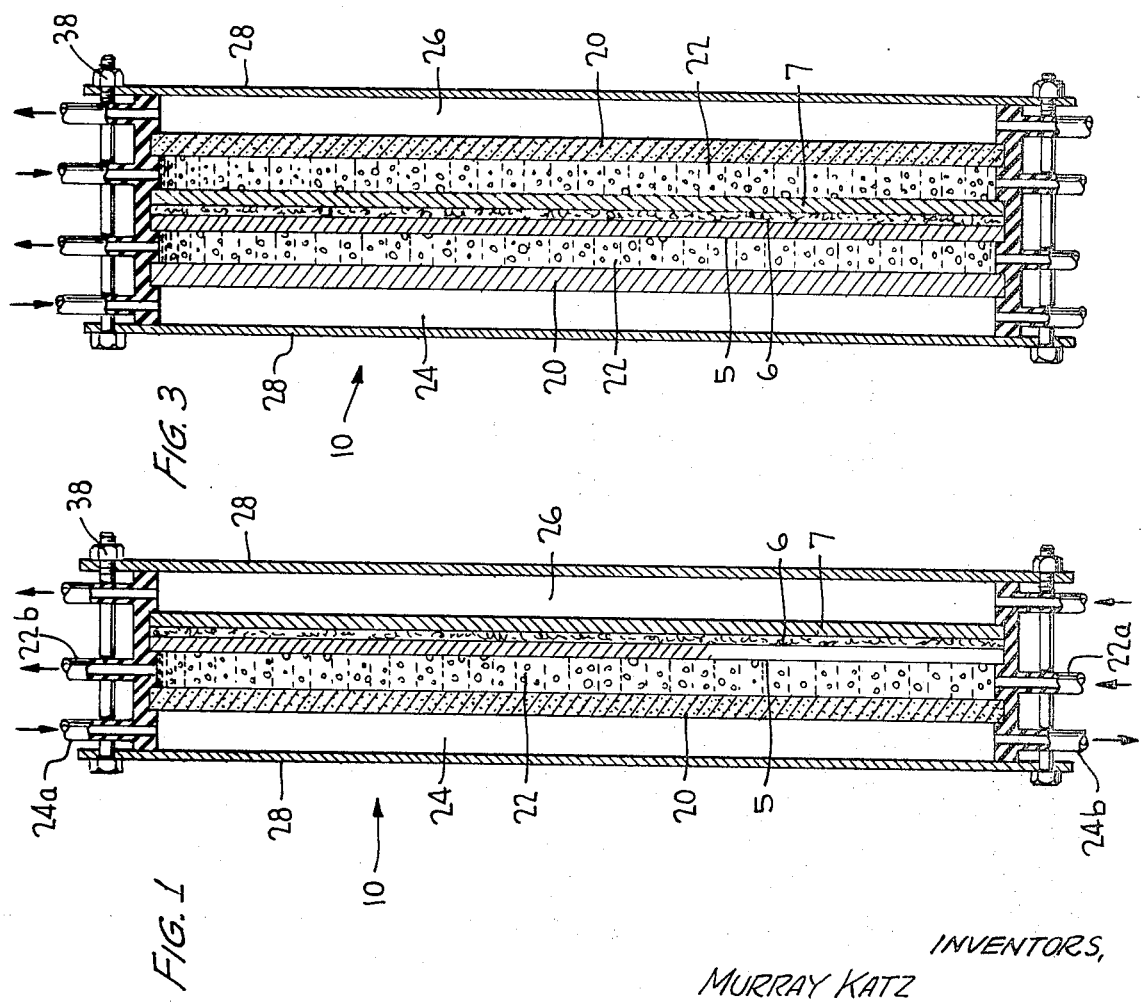
FIG. 3
FIG. 1
INVENTORS,
MURRAY KATZ
JAMES K. STEDMAN

ELECTROCHEMICAL CELL

FIELD OF INVENTION AND BACKGROUND

This invention relates to electrochemical cells and, more particularly, to an improvement in electrochemical cells utilizing a circulating electrolyte and achieving the advantages thereof, while maintaining a minute electrolyte spacing lowering the IR of the cell and permitting use of electrodes and electrode separators having low or zero bubble pressures. For convenience, hereinafter the invention will be described with reference to a fuel cell for the direct generation of electricity utilizing two non-consumable electrodes. As will be apparent, however, similar considerations governing the use of the invention in fuel cells will apply to other electrochemical devices enabling the use of the invention in such devices.

A fuel cell, as the term is employed herein, designates an electrochemical cell for the direct generation of electrical energy from a fuel and oxidant. With such cells it is not necessary to go through the usual conversion of chemical energy to heat energy to mechanical energy to electrical energy as is common with heat engines. Such cells in their most simplified design comprise a housing, an oxidant electrode, a fuel electrode, and an electrolyte. In operation, it is necessary that the fuel and oxidant contact a surface of their respective electrodes where a process of adsorption and desorption occurs leaving the electrodes electrically charged, with the second surface of the electrodes being in contact with the electrolyte. Depending upon the nature of the electrolyte, ions are transferred through the electrolyte from the anode to the cathode, or from the cathode to the anode. Electrical current is withdrawn from the cell and passed through a suitable load where work is accomplished.

The electrolyte of fuel cells can be a solid, a molten paste, circulating free-flowing electrolyte, or a liquid trapped in a hydrophilic matrix. Although certain design considerations such as compactness, low IR drop across the cell, and the use of non-self-supporting lightweight electrodes recommends cells utilizing a liquid electrolyte trapped in a hydrophilic matrix for many applications, there are distinct advantages in circulating electrolyte fuel cell systems over matrix-type electrolyte systems. A primary advantage is the operational flexibility offered by the bulk electrolyte in that it serves as an infinite reservoir to accommodate the volume tolerance requirements. Additionally, the circulating electrolyte serves as a convenient, heat-removable transfer fluid with no other coolant loops being required. Moreover, such fuel cells can operate on unscrubbed air by having a regenerator unit located external to the cell stack to receive the circulating electrolyte stream and remove carbon dioxide and other impurities from the electrolyte before returning it to the cell. However, circulating electrolyte fuel cells require a relatively large electrode spacing to ensure free circulation of electrolyte, to minimize pressure drop, and to avoid shorting of the cell due to unintentional contact between the anode and cathode of the cell. As apparent, therefore, a cell configuration offering the advantageous features of both a circulating electrolyte cell and an electrolyte matrix cell is imminently desirable.

OBJECTS OF THE INVENTION AND GENERAL DESCRIPTION

Accordingly, a primary object of the present invention is to provide a fuel cell which has the advantageous characteristics of a circulating fuel cell system while permitting a close spacing of the electrodes.

It is another object of this invention to provide a fuel cell employing a free-flowing or circulating electrolyte which minimizes internal electrolyte polarization and simplifies the bubble pressure requirements of the electrodes and electrode separator.

It is still another object of the present invention to provide a fuel cell employing a free-flowing or circulating electrolyte which permits use of electrodes and electrode separators with low or zero bubble pressures.

It is another object of this invention to provide a fuel cell employing a free-flowing or circulating electrolyte with its inherent infinite electrolyte reservoir to accommodate the volume tolerance requirements of the cell while having the advantages of a matrix-type cell.

It is another object of this invention to provide a fuel cell which uses gaseous reactants and a liquid circulating electrolyte and obtains maximum utilization of the reactants.

It is another object of this invention to provide a fuel cell utilizing a gas distributor in functional association with a cell electrode whereby a gaseous reactant intermixed with a flowing electrolyte contacts said electrode over substantially its entire reactive face.

These and other objects of the invention will be more readily apparent from the following detailed description, with particular emphasis being placed on the embodiments illustrated in the drawing.

In accordance with the present invention, a circulating electrolyte fuel cell is constructed which comprises in spaced relation a reactant chamber, a gas (bubble) distributor, an electrolyte chamber, a first electrode which is flooded with electrolyte, an electrolyte chamber, a second electrode, and means for feeding a second reactant to said second electrode. In accordance with this construction, the anode and cathode to the electrochemical cell are preferrably separated by a thin non-electrically conductive and ion-conductive separator which is or becomes impregnated with electrolyte. Alternatively, it is possible to construct the cell merely using an electrolyte chamber or space between the electrodes. In operation, the space will fill with electrolyte. However, in the latter construction care must be taken to avoid shorting of the cell as a result of the electrodes touching or contacting each other. The electrolyte is circulated in the electrolyte chamber adjacent the first electrode essentially flooding the electrode, feeding into the electrolyte chamber between the electrodes and interchanging with the electrolyte in the chamber. The reactants are fed to the cell under pressure. The reactant gas or bubble distributor, i.e., a sintered or multiple orifice plate, causes the reactant gas bubbles to eject into the electrolyte and directly contact the face of the electrode over substantially its entire reactive surface. Alternatively, it is possible to have an electrolyte chamber and a bubble distributor behind each of the electrodes and electrolyte circulated behind both electrodes of the cell. However, normally this is not required to provide the primary advantages of the present system.

The present construction permits a narrow spacing between the electrodes in comparison to designs of prior art circulating electrolyte systems where the electrolyte is circulated between electrodes requiring large spacings to minimize pressure drop and/or to permit built-in barriers with large bubble pressures. As a result of the thin electrode spacings, electrolyte ohmic polarizations are minimized resulting in higher power densities. Moreover, the present construction permits the use of thin electrodes and electrode separators with low or zero bubble pressure since the gas pressure in the bubble is virtually equal to the electrolyte pressure at the electrode. More specifically, in the designs where electrolyte is only circulated behind one electrode, if the unflooded electrode has a high bubble pressure, the need for a high bubble pressure matrix or high bubble pressure counterelectrode is eliminated. If a single high bubble pressure matrix is used, then low bubble pressure electrodes may be used for the anode and cathode similar to the anodes and cathodes employed in trapped electrolyte cells. Further, in the event the electrolyte is caused to flow by the face of both electrodes with each reactant bubbled into the respective streams, the need for a high bubble pressure matrix separator, and high bubble pressure fuel and oxidant electrodes is completely eliminated. The present design, in addition to the aforesaid advantages, has the inherent advantages of a free-flowing electrolyte system which includes heat removal, water removal, control of humidity of the cell, and the ability to use fuels or oxidants which contaminate the electrolyte such as the hydrocarbons or carbon oxides with a basic electrolyte, with the electrolyte being purified in an external unit.

THE DRAWING AND SPECIFIC EMBODIMENT

In order to more specifically illustrate the invention, reference is made to the drawing wherein FIG. 1 is a transverse sectional view of a single cell constructed in accordance with the present invention where the electrolyte is circulated behind only one of the electrodes of the cell;

FIG. 2 is a frontal view of one electrode of the cell; and

FIG. 3 is a transverse sectional view of a single cell illustrating a second embodiment of the invention where the electrolyte is circulated behind both of the electrodes of the cell.

In the drawing, like numerals designate like parts throughout.

Referring to the drawing, fuel cell 10 comprises anode 5 and cathode 7 spaced apart by a separator 6. In the embodiment shown, electrodes 5 and 7 are lightweight screen electrodes comprising a conductive nickel screen embedded in a uniform admixture of catalytic metal, in this instance platinum, and polytetrafluoroethylene particles. The ratio of platinum to polytetrafluoroethylene on a volume basis is 3 to 7, with the platinum loading of the electrode being 10 mg/cm$^2$. The electrodes are approximately 5 mils in thickness. The electrode separator 6 is pressed asbestos and is approximately 5 mils in thickness. The porous nickel sinter 20, approximately 15 mils in thickness, is spaced adjacent to anode 5 with the anode and sinter forming a chamber 22 there between anode 5 and housing 28 forming a second chamber 24. A further chamber 26 is formed adjacent cathode 7 by the cathode and housing 28. The entire cell assembly is held together with threaded tie rod 38 at either end of the cell. It is to be understood that although in the embodiment shown in FIG. 1, the anode is the flooded electrode, it can just as well be the cathode.

In operation, a 30-percent aqueous potassium hydroxide electrolyte solution is pumped into electrolyte chamber 22 through inlet 22a at a controlled rate where it floods anode 5 and is removed from the cell through exit 22b. The electrolyte, after it floods the anode, will flood separator 6. Due to mixing, electrolyte within electrode separator 6 is continually exchanged with the electrolyte in chamber 22 and also maintaining the electrolyte volume within the separator constant. A reactant gas, in this instance hydrogen, is fed to anode chamber 24 through inlet 24a with excess gas being removed through outlet 24b. As a result of the gas being under pressure, the gas will pass through bubble distributor 20 causing bubbles to eject into the electrolyte directly at the face of electrode 5. The pressure and plate design are such to ensure that the bubble flow through the electrolyte is at a high volume in comparison to the velocity of the electrolyte stream to maximize the amount of gas reaching the electrode and to minimize diffusion polarization at the electrode. FIG. 2 shows a frontal view of electrode 5 with the major portion of the electrode exposed to reactant bubbles and the flow of turbulent electrolyte between the bubbles. An oxidant, in this instance air, is fed into reactant chamber 26 through inlet 26a contacting cathode 7, with excess air and impurities being vented through exit 26b. The cell when operated at a constant current drain will provide a substantially constant cell output. There is little fluctuation in current characteristics of the cell since the entire volume tolerance function in the cell is controlled by the circulating electrolyte. Moreover, as noted hereinbefore, the bubble pressure of the anode 5 and separator 6 can be very low, only requiring a high bubble pressure at cathode 7. Alternatively, separator 6 can have a high bubble pressure, permitting the use of a cathode having a low bubble pressure.

FIG. 3 illustrates the cell substantially similar to that shown in FIG. 1. However, in this instance a second electrolyte chamber is maintained behind cathode 7 in combination with a second bubble distributor 20. Utilizing this design, a more uniform control of the thermal characteristics of the cell is realized. Moreover, this embodiment completely eliminates the need for a high bubble pressure matrix separator and/or high bubble pressure fuel and oxidant electrodes.

Although the present invention has been described with reference to lightweight electrodes comprising a metal support screen embedded in a catalytic mixture of metal and hydrophobic plastic binder, other electrodes, such as porous metal sinters, carbon disc, and the like can be employed. Moreover, although it is indicated that the electrode separators are made of asbestos, other hydrophilic separators can be utilized including ceramic materials and polymeric materials. In addition to porous nickel sinters, the bubble distributor can be made of any material which is resistant to the corrosive influences of the electrolyte including porous copper, tantalum, iron, and the like. Moreover, it is not necessary that the bubble distributor be a metal sinter. A multiple orifice plate constructed of metal or a plastic can be utilized with it only being essential that the distributor direct reactant gas directly to the face of the electrode through the turbulent flowing electrolyte.

The operating temperature of the cell can vary as long as it is not above the critical temperature of the electrodes and/or electrode separator being utilized. Preferably, the operating temperature of the cell will be in the range of from about 20° to 250°C. In addition to the potassium hydroxide electrolyte disclosed hereinbefore, other commonly employed aqueous electrolytes exemplified by aqueous solutions of the alkali hydroxides, alkaline earth hydroxides, and carbonates; as well as strong acid electrolytes such as hydrochloric acid, sulfuric acid, nitric acid, and phosphoric acid can be used. Commonly employed reactants in addition to hydrogen and oxygen can be utilized in the cells of the present invention.

Although the present invention is described and illustrated in the drawing with reference to single cells, it will be apparent that in the preferred construction a plurality of cells will be stacked together utilizing manifold feed arrangements for the fuel and oxidant as well as a manifold system for circulating the electrolyte through the plurality of cells. In constructing the cell stack, it may be desirable to arrange the cells in order that a single reactant chamber will service the electrodes of adjacent cells. This will contribute to the compactness of the cell stack. As will be apparent to those skilled in the art, various other modifications can be made in the over-all cell design to meet operating conditions. For example, a stack of cells employing the concept of this invention can utilize a regenerator system with the circulating electrolyte in order to remove carbon dioxide and/or other impurities from the electrolyte. A regenerator unit in combination with a fuel cell is described, for example, in U.S. Pat. No. 3,331,703. These modifications being within the ability of one skilled in the art are to be covered herein with the invention only being limited in accordance with the appended claims.

It is claimed:

1. A fuel cell having a pair of opposed electrodes electrically connected through a work load, a first non-circulating electrolyte chamber between said pair of electrodes, a porous gas distributor plate positioned behind and spaced from at least one of said pair of electrodes, said one electrode and distributor plate forming a second electrolyte chamber, said second electrolyte chamber being behind said one of said electrodes, a reactant chamber behind and at the surface of said porous gas distributor plate not fronting the said second electrolyte chamber; inlet, outlet, and flow control means constructed and arranged with said second electrolyte chamber for controlled flow of electrolyte through said chamber; at least said one electrode being hydrophilic permitting electrolyte communication from said second electrolyte chamber with said first electrolyte chamber between said pair of electrodes through said one electrode.

2. The fuel cell of claim 1 wherein a porous gas distributor plate is positioned behind and spaced from each of said pair of electrodes thereby forming an electrolyte chamber as defined behind each of said electrodes.

3. The fuel cell of claim 1 wherein the said electrode is a homoporous electrode comprising a uniform admixture of catalyst metal and hydrophobic polymer having a substantially zero bubble pressure.

4. The fuel cell of claim 2 wherein both of said electrodes is a homoporous electrode comprising a uniform admixture of catalyst metal and hydrophobic polymer having a substantially zero bubble pressure.

5. The fuel cell of claim 1 wherein the bubble distributor is a porous sinter having a porosity of from about 10 to 80 percent.

6. The fuel cell of claim 5 wherein the porous sinter is nickel.

7. The fuel cell of claim 1 wherein the bubble distributor is a porous plate having a plurality of orifices.

8. The fuel cell of claim 7 wherein the porous plate is metal.

9. The fuel cell of claim 7 wherein the porous plate is plastic.

10. The fuel cell of claim 2 wherein the bubble distributors are each porous sinters having a porosity of from about 10 to 80 percent.

11. The fuel cell of claim 2 wherein the bubble distributors are each porous plates having a plurality of orifices.

12. The fuel cell of claim 11 wherein the porous plate is metal.

13. The fuel cell of claim 11 wherein the porous plate is plastic.

14. The process of generating electrical energy in a fuel cell comprising a fuel electrode, an oxidant electrode, and a first non-circulating electrolyte chamber between said electrodes, said cell having in combination therewith a porous gas distributor positioned behind and spaced from at least one of said electrodes to provide a second electrolyte chamber behind said one of said electrodes, including the steps of feeding a gas to said gas distributor at the surface thereof not in contact with said electrolyte chamber under controlled conditions and feeding an electrolyte into said second electrolyte chamber, whereby said reactant gas will pass thorugh said porous distributor and into said free flowing electrolyte in said second electrolyte chamber and to the face of said one electrode, said flowing electrolyte in said second electrolyte chamber continuously interchanging with electrolyte in said first electrolyte chamber through said one electrode.

15. The fuel cell of claim 7 wherein the porous plate is carbon.

16. The fuel cell of claim 11 wherein the porous plate is carbon.

* * * * *